United States Patent [19]

Garcia

[11] Patent Number: 4,610,104
[45] Date of Patent: Sep. 9, 1986

[54] CAPSULE FISHING FLOAT

[76] Inventor: Julio Garcia, 1402 Fredericksburg Rd., San Antonio, Tex. 78201

[21] Appl. No.: 747,908

[22] Filed: Jun. 24, 1985

[51] Int. Cl.$^4$ ............................................. A01K 93/00
[52] U.S. Cl. ...................................... 43/41.2; 43/44.9
[58] Field of Search ................................ 43/41.2, 44.9

[56] References Cited

U.S. PATENT DOCUMENTS

| 2,292,743 | 8/1942 | Cordry | 43/41.2 |
| 2,498,815 | 2/1950 | McVay | 43/44.9 |
| 2,629,198 | 2/1953 | Johnston | 43/41.2 |
| 2,910,798 | 11/1954 | Bias | 43/41.2 |
| 4,075,777 | 2/1978 | Dalton | 43/41.2 |
| 4,222,194 | 9/1980 | Thorvaldsen | 43/41.2 |

Primary Examiner—Nicholas P. Godici
Assistant Examiner—Christopher L. McKee
Attorney, Agent, or Firm—Ranseler O. Wyatt

[57] ABSTRACT

A Capsule Fishing Float providing a buoyant, substantially cone-shaped body portion and a rod inserted into said body, and extending below said body, and being substantially heavier than the body portion, and aligned passageways through said rod and body member adapted to receive a fishing line, the lower portion of the rod being tubular to house a fishing weight and hook in retrieved position, and relief ports in said lower portion of the rod to permit ready escape of air in said tubular portion of the rod when the float is cast into the water, and a stop on said fishing line limiting the depth of the hook from the float.

5 Claims, 2 Drawing Figures

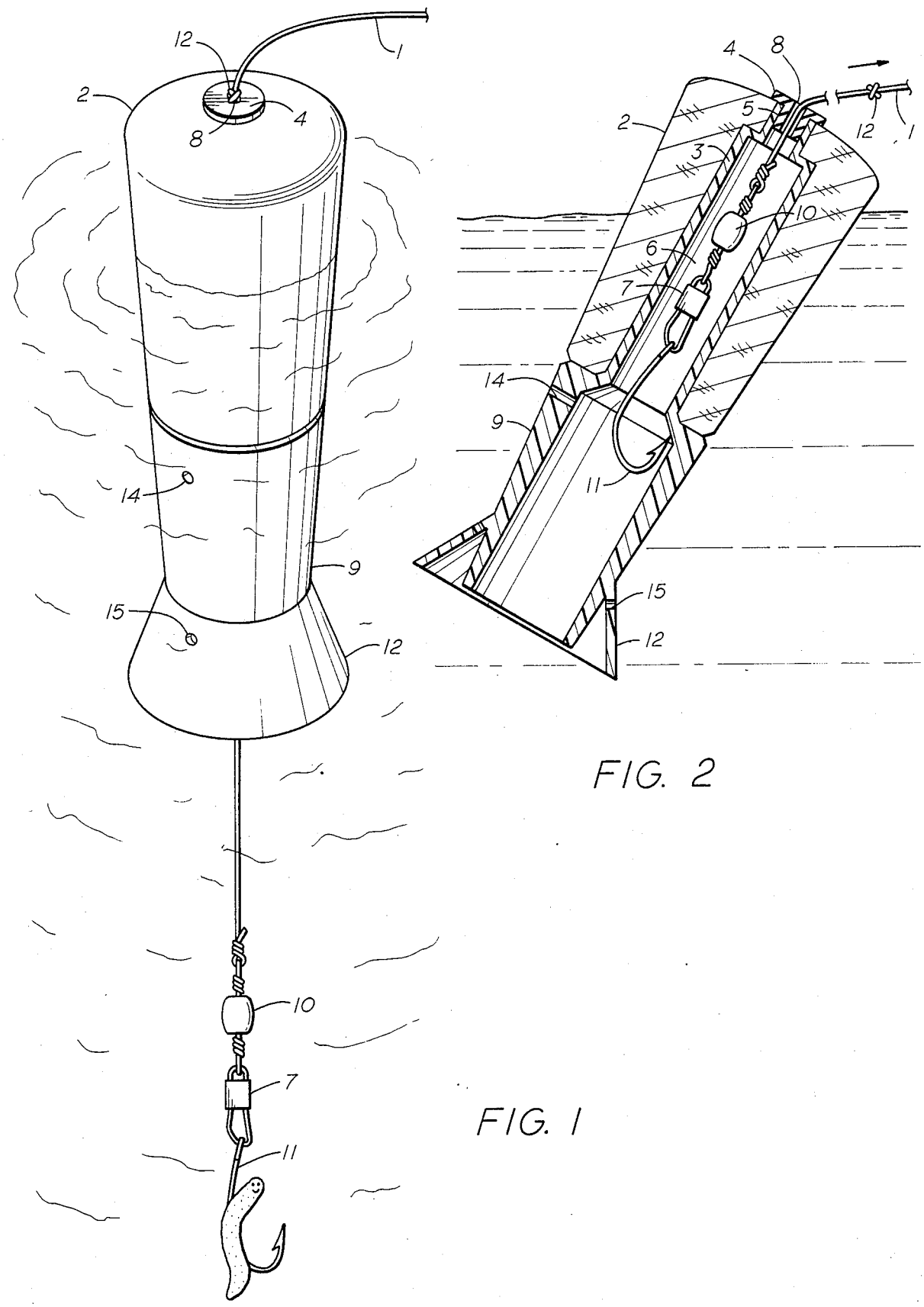

CAPSULE FISHING FLOAT

BACKGROUND OF THE INVENTION

Fishing floats have been in use for many years, and have taken many shapes and forms, but always comprises a body of cork or similar buoyant material, secured to a line, with a hook beneath the body, exposed to snag flesh or debris, clothing or the like. It is an object of this invention to provide a novel float having means for protection against accidental contact with the hooks, protecting the hook, and releasing the hook to exposure only after the float contacts the water.

SUMMARY OF THE INVENTION

A capsule fishing float having a buoyant body member through which a vertical axial passageway is formed, into which is inserted a weighted tubular member and a plug in the upper end of the vertical passageway in said body member having a vertical passageway therethrough, through which a fishing line extends, the line having a weight and hook thereon extending beneath said body member, a means on the fixed line above said body member for limiting the downward movement through said vertical passageway in the body member, and the tubular member forming a chamber to receive the hook and weight when the fishing line is retrieved.

BRIEF DESCRIPTION OF THE DRAWINGS

FIG. 1 is a pictorial view of the device, showing the tubular member.

FIG. 2 is a side elevational view of the device, partially in cross section, showing the hook in retrieved position.

DESCRIPTION OF THE PREFERRED EMBODIMENTS

In the drawings, the numeral 1 designates a fishing line on which the device is to be mounted. A buoyant body member formed of cork, plastic, or similar rigid buoyant material, 2, substantially cone shaped, being elongated and having its side walls tapered inwardly and downwardly, and having a chamber therein forming a vertical, axial passageway 3 which is reduced in diameter at one end, terminating in a restricted opening 5 at the upper end thereof in which a plug 4 having a passageway extending axially and vertically therethrough, is inserted. The plug 4 receives the fishing line which extends therethrough.

A rod 6 fits tightly in the vertical passageway 3 of the body member 2, and flares outwardly approximately midway of the longitudinal ends thereof, forming a stop adjacent the lower end of the body member 2, and being increased diametrically over the lower portion 9 of the rod, and said lower portion of the rod being tubular, with the upper portion of the rod having a vertical axial passageway 7, aligned with the passageway 5 in the plug 4.

The lower end of the rod 6 is substantially heavier than the upper portion and the body member 2, so that when in the water, the lower end of the rod will be submerged and the buoyant body member will float on the surface of the water. The tubular portion of the rod has air relief ports 14, through the wall of the tubular portion to permit air to escape upon contact with the water, providing quick and easy release of the weight and hook, 10,11. Gravity will maintain the weight and hook in the tubular member while the float is being cast, and as the float strikes the water, and flips, the lower portion 9 submerging, the air in the lower portion will be released and the hook and weight will drop.

The user may predetermine the depth of the weight and hook by placing a knot in the fishing line, or securing a stop means, at the desired position so that when the float strikes the water, the weight and hook will be released and drop until the stop means contacts the plug 4.

A flared skirt 12 is mounted on the lower end of the rod 6 to guard the hook in the event it becomes lodged on the rim of the rod as it is being retrieved. Relief ports as 15 provide for the escape of air when the device contacts the water.

What I claim is:

1. In a capsule fishing float, a body member formed of buoyant material, a chamber in said member, a rod mountable in said chamber, being diametrically expanded midway its ends and the lowermost portion being tubular, a vertical axial passageway through said rod and body member through which a fishing line extends, the lower most portion of said rod being sized to allow a weight and hook to move completely within said rod during casting and retrieval; the tubular end of the lower most portion of said rod being surrounded and encompassed by an annularly flared skirt member operable to shield the point of a hook when, per chance, it is caught on said tubular end.

2. The device defined in claim 1 wherein the chamber in said body member has a restricted opening at one end, a plug mounted in said restricted opening, and a vertical, axial passageway through said plug.

3. The device defined by claim 1 wherein the body member is substantially cone shaped, having downwardly and inwardly tapered side walls.

4. The device defined in claim 1 wherein said tubular lower portion of said rod is of greater weight than the buoyant body member.

5. The device defined in claim 1 wherein a restricted opening is formed in said body member, and stop means on said fishing line selectively mounted to abut said restricted opening to determine the depth of the fishing hook when in fishing position.

* * * * *